Patented Apr. 2, 1929.

1,707,597

UNITED STATES PATENT OFFICE.

GUIDO BLENIO, OF NEW YORK, N. Y.; PAULINE BLENIO ADMINISTRATRIX OF SAID GUIDO BLENIO, DECEASED.

FIRE-EXTINGUISHING COMPOUND.

No Drawing.  Application filed July 22, 1922. Serial No. 576,825.

This invention relates to fire extinguishing compounds of the foam producing type, and it is my prime object to produce a fire extinguishing foam which is practically clear or white in color, very light in weight, tenacious in texture and capable of spreading over exposed surfaces with great rapidity.

Another object includes the preparation and use of saponified aluminum compounds, as foam producing elements, possessing the above-enumerated qualities in marked degree.

A further object includes the production of a foam producing compound which will not decompose, will not readily freeze and which will be available for instant and effective use in time of need.

For these purposes I have found, after long experiments, aluminum compounds, as aluminum palmitate, aluminum oleate, aluminum resinate, aluminum stearate, or the like, to be most effective, when these compounds are properly treated as stated below. The treated products may be used alone or in combination, and, in some instances, I may include even crude resin with excellent results. In all cases, however, must the compounds be treated by an alkali or basic carbonate or bicarbonate. For this purpose any one, or several, of the aluminum compounds may be used, and I will give a specific example, without, however, unnecessarily limiting myself thereby.

Having selected the aluminum compound, or a combination of several of said compounds best suited for the purpose at hand, I thoroughly pulverize the selected compound, or compounds, if in the dry form, which is preferred. With this pulverized material I then thoroughly mix, by any suitable means, approximately three parts, by weight, of any strong basic carbonate or bicarbonate. It is evident that at this stage the mixture may be shipped, or it may be stored for future use, as may be desired, and the final saponifying treatment may then be given at any time in preparation for use.

The treatment may be effected by adding to the powdery mixture, a sufficient quantity of warm or hot water and agitating to form a smooth pasty mass. This mass is then permitted to stand quiescent for from one to six hours, depending upon conditions under which it is made and the character of the ingredients used. After the treatment has been fully effected, more water is slowly added, up to twelve or more parts, by measure, and the treated aluminum compound solution is ready to be placed in a suitable container for use. The solution thus prepared may be designated as the basic agent, which, when brought into contact with an acid reagent and gas liberating agent, causes a violent reaction with production of vast quantities of very light, clean and quickly spreading fire extinguishing foam.

As the acid reagent, I may most effectively use the acidulated aluminum sulfite liquor which forms the subject-matter of my application, Serial No. 531,283, filed January 23, 1922, which on April 8, 1924, was patented as No. 1,489,692; or I may use diluted acid or acid salt solutions. If sulfuric acid is used, I dilute the same with water up to ten or more parts, as may be required. Where acid salts are used, such as the acid sulfate or phosphate of ammonia, the sulfate of aluminum or magnesium, and the like, solutions are made up to 15° B. For instant use the acid reagent may be kept in a container apart from the basic agent in such a manner that the same are readily brought into contact, as is well understood, for the evolution of the fire extinguishing foam product.

I find that my treated aluminum compounds produce a foam which will leave no deposits, and when my treated acid sulfite liquor is used in conjunction therewith, no acid stain will be left on goods subjected to a fire extinguishing treatment. The solution is further free from sediment and will keep for years without decomposing or breaking down.

While I have described a specific embodiment of my invention, I do not thereby desire to be understood as thus limiting myself unnecessarily.

What I, therefore, claim as new and useful, and of my own invention, and desire to secure by Letters Patent is:

1. A composition made by mixing an aluminum soap with a carbonate.

2. As a composition of matter a carbonate and a saponified aluminum compound employed as a foam producing agent.

3. As a composition of matter an aluminum soap and a carbonate intermingled with water and capable of producing a mass of spreading foam when brought into contact with a reagent.

4. In a fire extinguisher of the type employing an acid agent and an ingredient which upon contact with the acid will liberate a gas and produce a foam, the employment of a saponified aluminum compound as the foam producing agent.

5. In a fire extinguisher of the type employing an acid agent and an ingredient which upon contact with the acid will liberate carbon dioxide and produce a foam, the employment of a saponified aluminum compound and a carbonate as the foam producing agent.

6. A fire extinguishing composition comprising an aluminum soap and containing rosin and a carbonate.

In testimony whereof I have hereunto set my hand on this 9th day of March A. D., 1922.

GUIDO BLENIO.